US006422457B1

(12) United States Patent
Frich et al.

(10) Patent No.: US 6,422,457 B1
(45) Date of Patent: Jul. 23, 2002

(54) ACCESS DEVICE FOR A MATERIALS DEPOSITORY

(76) Inventors: Mark R. Frich, 12 Ferndale St., Maplewood, MN (US) 55119; Richard H. Jackson, 1835 63rd St. East, Inver Grove Heights, MN (US) 55077

( * ) Notice: Subject to any disclaimer, the term of this patent is extended or adjusted under 35 U.S.C. 154(b) by 0 days.

(21) Appl. No.: 09/507,614

(22) Filed: Feb. 21, 2000

(51) Int. Cl.[7] ................................................ B65G 11/04
(52) U.S. Cl. .............................................. 232/44; 49/31
(58) Field of Search .............................. 232/43.1, 43.2, 232/43.3, 43.4, 43.5, 44; 49/25, 400, 31; 220/260; 318/480; 235/379; 312/211

(56) References Cited

U.S. PATENT DOCUMENTS

| | | | | |
|---|---|---|---|---|
| 3,465,955 | A | | 9/1969 | DeBoer et al. |
| 3,854,656 | A | | 12/1974 | Bishop et al. |
| 3,942,435 | A | | 3/1976 | Aultz et al. |
| 4,245,902 | A | * | 1/1981 | Cataldo et al. |
| 4,665,839 | A | | 5/1987 | Heyl |
| 4,754,126 | A | * | 6/1988 | Caldwell |
| 4,996,467 | A | * | 2/1991 | Day |
| 5,029,753 | A | | 7/1991 | Hipon et al. |
| 5,082,171 | A | | 1/1992 | Homel et al. |
| D330,105 | S | | 10/1992 | Schnitz, Jr. |
| 5,176,315 | A | | 1/1993 | Homel |
| 5,284,101 | A | | 2/1994 | Oder et al. |
| 5,412,297 | A | * | 5/1995 | Clark et al. |
| 5,932,982 | A | * | 8/1999 | Pezzelli, Jr. |
| 5,979,750 | A | * | 11/1999 | Kindell |
| 6,010,239 | A | * | 1/2000 | Hardgrave et al. |
| 6,047,885 | A | * | 4/2000 | Fisher |
| 6,074,156 | A | * | 6/2000 | Frich ..................... 414/331.01 |
| 6,123,223 | A | * | 9/2000 | Watkins |

* cited by examiner

*Primary Examiner*—Jack Lavinder
*Assistant Examiner*—William L. Miller
(74) *Attorney, Agent, or Firm*—Robert A. Pajak; Walter K. Roloff

(57) ABSTRACT

An access device for a materials depository includes a panel member having opposing front and rear faces with a return aperture disposed therethrough, a door having size dimensions capable of fully blocking the return aperture, and a door actuator coupled to the door for causing the door, in response to a command signal, to selectively slide between a blocking position where the return aperture is blocked by the door, and an unblocking position where the return aperture is not blocked by the door. The access device also includes a materials sensor for providing a materials alarm signal that is indicative of a presence of materials intended to be passed through the return aperture. The access device further includes a control system that is responsive to the materials alarm signal, for providing the command signal.

42 Claims, 7 Drawing Sheets

ACCESS DEVICE FOR A MATERIALS DEPOSITORY

FIELD OF THE INVENTION

The present invention relates generally to a materials depository, and specifically to an access device for providing patron access to a library materials depository.

BACKGROUND OF THE INVENTION

A "depository" is generally characterized as an unattended or free-standing receptacle for deposit or "return" of materials thereinto by patrons. A depository generally includes protection against theft and vandalism for materials returned therein. A depository may be variously termed, for example, a "night depository", an "after hours depository", or a "drop box".

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of libraries in handling these ever-increasing volumes are often overwhelming.

In response to such growing volumes of materials, automated methods for materials handling have been developed for library environments. For example, exterior or "outdoor" depositories have been implemented in many libraries so that patrons need not enter the library building to make their returns, and library personnel are not required to immediately handle returns of library materials from the patrons.

Generally, implementation of a depository in a library environment advantageously obviates any need for library staff to assist patrons in return processes. That is, a depository serves as a common receptacle for materials being returned from patrons; when time permits, library personnel may then check-in returned materials en masse. In this way, valuable working time of library staff may be efficiently utilized by elimination of sporadic "over the counter" returns from patrons that interrupt performance of other tasks.

Furthermore, with such large volumes of materials in circulation and with growing numbers of patrons, there is a need for "after hours" returns of materials from patrons who could not otherwise visit the library, in a particular instance, during regular hours of operation. An exterior accessible depository serves this need, by allowing patrons to make secured returns to the library when the library is closed. Such an exterior accessible depository is herein referred to as, simply, a depository. The depository may provide "drive up" service to patrons, by allowing access thereto from a vehicle driveway provided immediately adjacent to the depository. In such a drive-up depository, patrons may access the depository without leaving their vehicles, which is particularly comfortable in an adverse outdoor environment such as when rain or snow is falling, for example. Indeed, inherent convenience provided to patrons using a drive-up depository commonly results in drive-up depository use even during regular hours of library operation.

It is a fundamental requirement of such a depository that it be simple, rugged, virtually automatic in operation, and resistant to theft or vandalism of materials received therein.

In general, aside from library applications, attempts have been made to respond to problems associated with return of materials, particularly in bank and post office environments.

For example, U.S. Pat. No. 4,665,839 entitled "Depository" issued to Heyl provides an apparatus for receiving a bank deposit in a bank depository in which the deposit is inserted through a doorway into an attack resistant, enclosed movable compartment or carrier that carries the deposit to a position for introduction to a vault.

U.S. Pat. No. 5,284,101 issued to Oder et al. and entitled "After Hour Depository Door Securement Mechanism" teaches a night depository providing full closing of a depository door after initiation of closure thereof, with resistance to jamming.

In U.S. Pat. No. 5,176,315 entitled "Book Receptacle with Collapsible Container" issued to Homel, and in U.S. Pat. No. 5,082,171 entitled "Book Return with Collapsible Bag Receptacle" issued to Homel et al., a book depository is disclosed that employs a casement which defines a door compartment having a frontal access opening.

U.S. Pat. No. 5,029,753 issued to Hipon et al. and entitled "Garage Door Mail Drop Box" discloses a mail drop box incorporated with a mail slot in a garage door for receiving mail deposited therein.

In U.S. Pat. No. 3,942,435 issued to Aultz et al. and entitled "Depository for Receiving, Imprinting and Storing Deposited Articles of Variable Thickness" a depository is provided that is capable of providing uniformly consistent imprints on articles of varying thickness without a need for adjustment as article thickness varies.

U.S. Pat. No. 3,854,656 issued to Bishop et al. and entitled "Postal Drop Box" discloses a device for secure drop-box article containment.

In U.S. Pat. No. 3,465,955 issued to DeBoer et al. and entitled "Night Depository" a device is disclosed that includes a pull-down access hopper or door for accepting deposits thereinto.

In terms of security and patron access, implementation of a depository as disclosed in the aforementioned patents has several disadvantages. For example, many simple drop box depositories do not include an access door. Consequently, secure containment of materials, placed therein, is not possible and the materials are therefore easily subject to unauthorized withdrawal, theft, or vandalism.

Another disadvantage inherent in these patents and in devices similar thereto is that typical pull-down depository access doors provided with most secure depositories introduce particular handling problems. That is, persons using such secure depositories typically experience difficulty in handling materials to be placed therein and, simultaneously, pulling down or opening the depository access door. Additionally, depending upon a person's stature or physical circumstances, the person may need to uncomfortably reach up to the pull-down door and simultaneously lift up the materials for deposit; conversely, some persons may need to uncomfortably bend and reach down to accomplish the same task.

These aforedescribed handling problems exist for able-bodied individuals, and are exacerbated for persons having physical disabilities or limitations. Indeed, many such depositories are not compliant with the Americans with Disabilities Act ("the ADA") or at least are not "user-friendly" for disabled persons.

Furthermore, drive-up depositories incorporating the typical pull-down access door also have their own unique operational limitations and disadvantages. For example, it is common for a person to drive their vehicle closely to a drive-up depository, particularly when adverse weather conditions exist. In this situation, the pull-down door typically abuts and is interfered with, or is at least partially obstructed, by the vehicle's body. Inevitably also, in adverse weather, contaminants such as rain or snow fall upon the materials as they are being deposited via the pull-down door.

Another disadvantage of a depository utilizing a pull-down access door is that a person using such a depository risks having their fingers pinched upon closing the door.

Yet another disadvantage of a common depository arises inherently from utilization of a typical "slide chute" for transportation of materials being returned at the depository to a processing "check-in" area or storage container. Such use of slide chutes commonly leads to problems of "shingling" or "pinch points" affecting the materials. That is, upon sliding down the chute and reaching a bottom or "run out" portion of the chute, the materials usually become piled upon each other or "shingled" and eventually become jammed (at a pinch point) therein. Consequently, the materials need to be manually un-jammed or de-shingled before further handling can occur.

Thus, there exists a need for an access device for a materials depository that (i) provides security to the depository, (ii) alleviates problems associated with handling materials to be deposited and simultaneously opening the depository access door, (iii) allows for deposit of materials without uncomfortable reaching or bending, (iv) is "user-friendly" for disabled persons, (v) does not interfere with a vehicle body in a drive-up installation, (vi) provides protection for materials being deposited from environmental contaminants, (vii) affords protection from pinched fingers or other bodily hazards, and (viii) prevents pinching or shingling of the deposited materials.

SUMMARY OF THE INVENTION

An object of the present invention is to provide an access device for patron access to a library depository that is capable of selectively providing access to the depository.

Another object of the present invention is to provide an access device for patron access to a library depository that alleviates problems associated with handling materials to be deposited and simultaneously operating the depository.

A further object of the present invention is to provide an access device for patron access to a library depository that allows for deposit of materials without uncomfortable reaching or bending.

A yet further object of the present invention is to provide an access device for patron access to a library depository that is "user-friendly" for disabled persons and may be compliant with the ADA.

A still further object of the present invention is to provide an access device for patron access to a library depository that does not interfere with a vehicle body in a drive-up installation.

Yet another object of the present invention is to provide an access device for patron access to a library depository that provides protection for materials being deposited from environmental contaminants.

Another object of the present invention is to provide an access device for patron access to a library depository that affords protection from pinched hands and fingers.

Still another object of the present invention is to provide an access device for patron access to a library depository that alleviates problems associated with pinching or shingling of materials being deposited.

In accordance with the present invention, an access device is provided that incorporates a materials return aperture. The return aperture is selectively blocked or unblocked by a door that moves in response to one or more actuators. Each actuator, and thus the door, is capable of being operatively controlled by a control system and by a sensor for sensing desired use of the access device. Upon introduction of materials at and through the return aperture, a motorized conveyor may transport the materials to a check-in station or receiving bin. The access device may further include a materials "check-in" apparatus and process for cataloging returned items and printing a receipt for the materials checked-in.

DETAILED DESCRIPTION OF THE INVENTION

Figure 1:
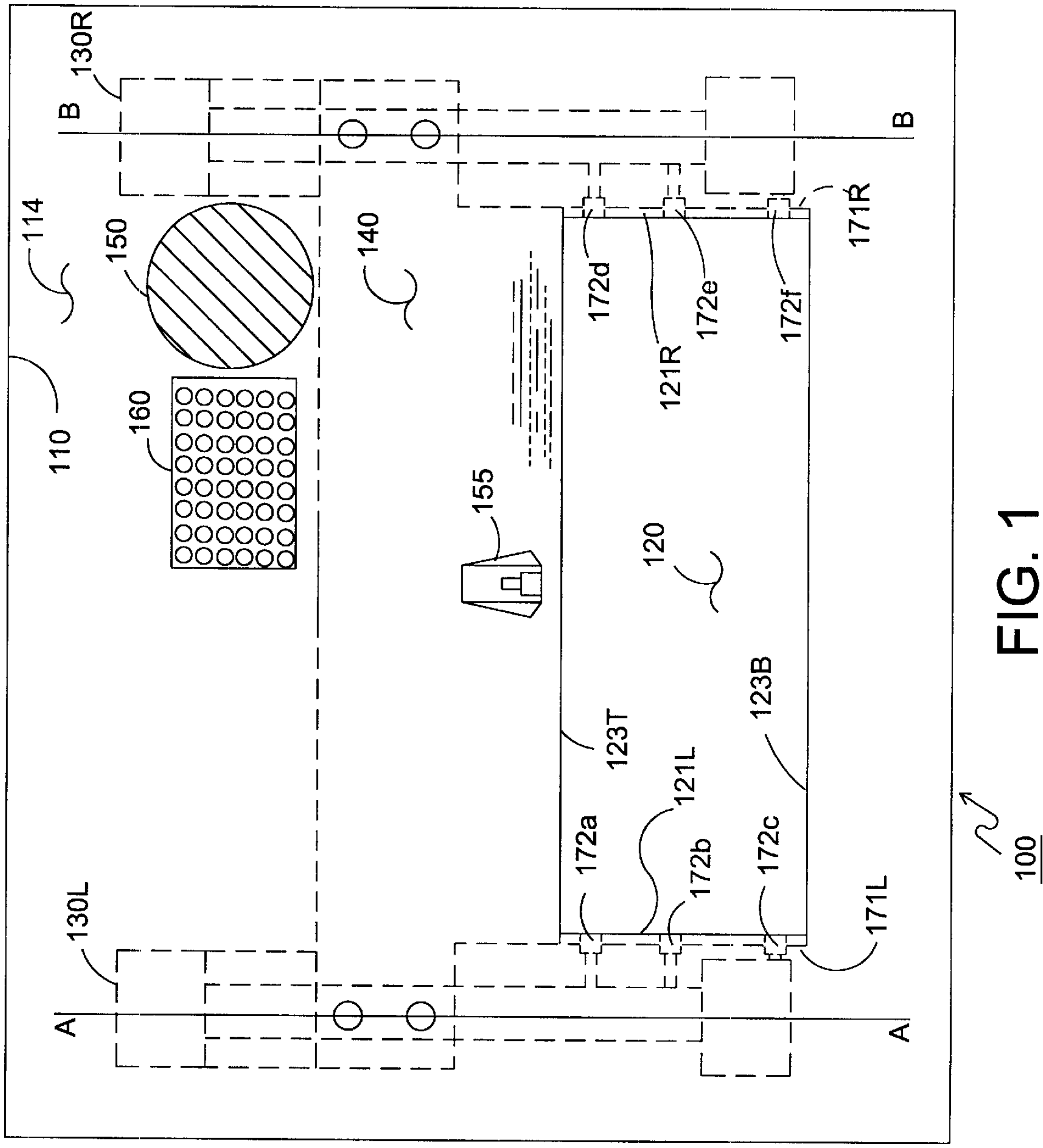
FIG. 1 is a front view illustration of an access device constructed in accordance with the present invention, and depicting an open, receiving, or unblocked condition.
Figure 2:
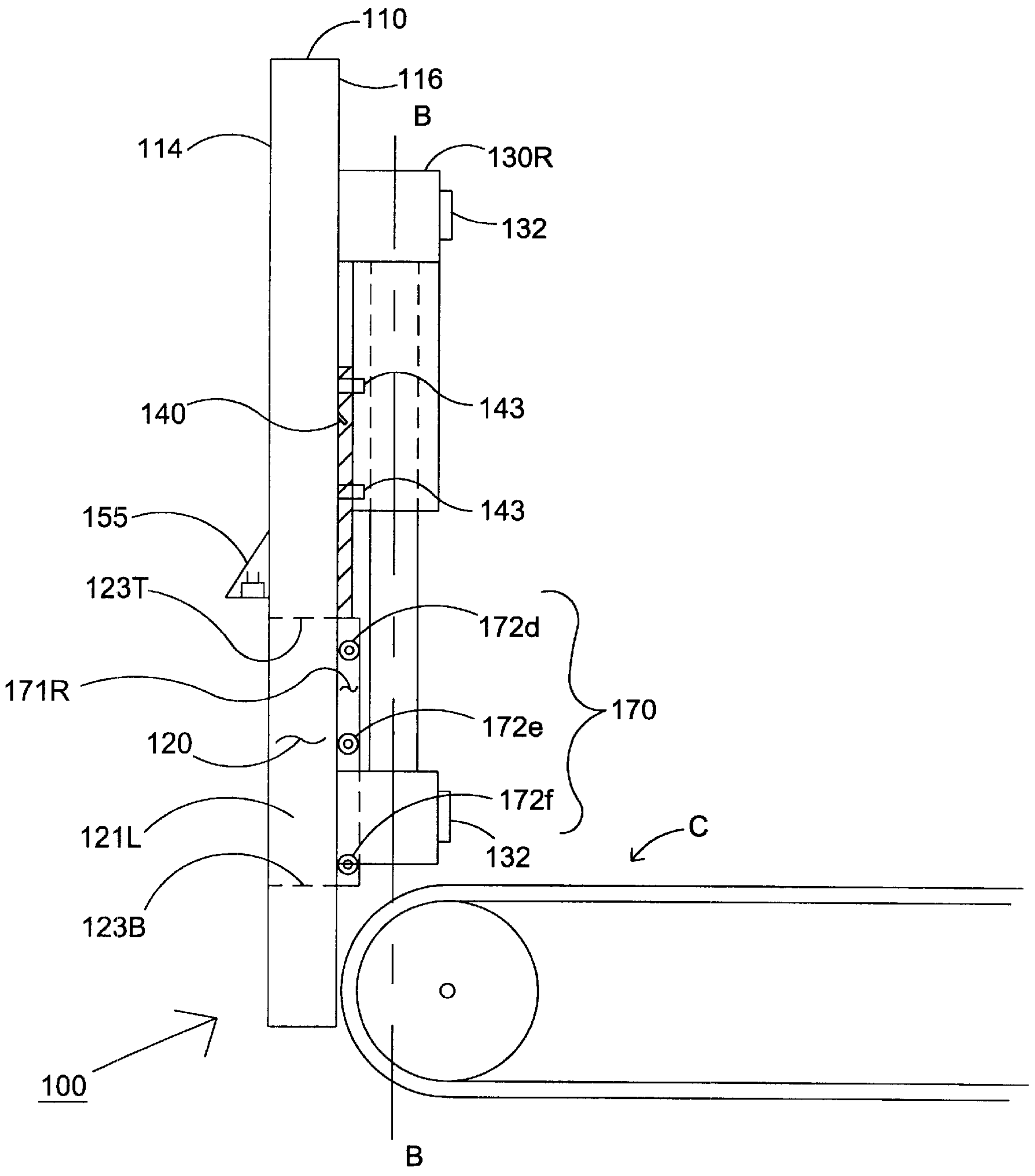
FIG. 2 is a right side view illustration of the access device constructed in accordance with the present invention.
Figure 3:
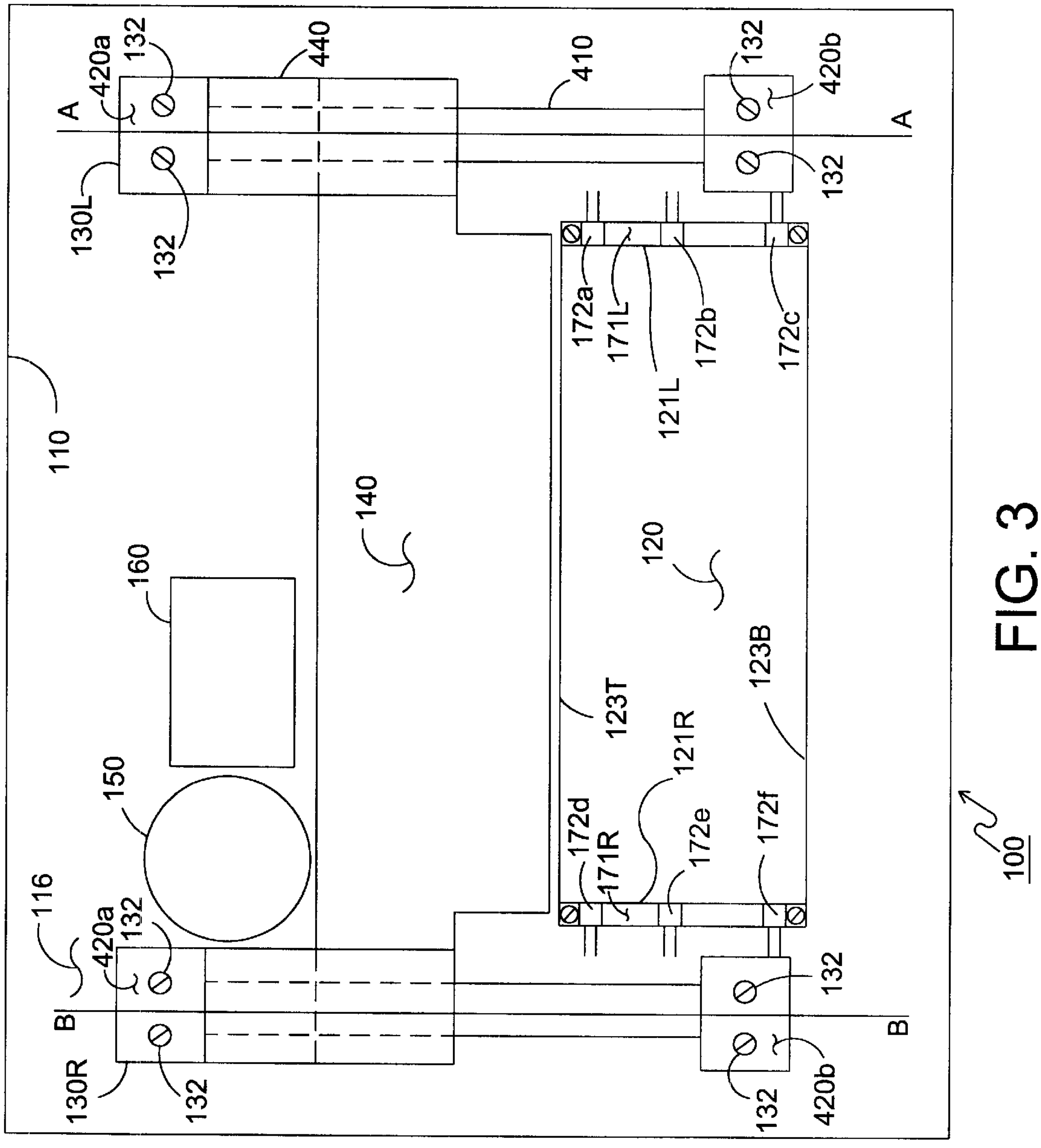
FIG. 3 is a rear view illustration of the access device constructed in accordance with the present invention.

Referring to FIGS. 1, 2, and 3, thereshown is a front view, right side view, and rear view, respectively, of an access device for a materials depository constructed in accordance with the present invention. Therein, access device 100 (hereinafter, "device 100") is illustrated in transparent schematic fashion, so that inner details may be readily ascertained, as will be described. It should be appreciated that, although the following exposition is directed to a library depository for receipt of library books and materials being returned by library patrons to the library, device 100 has a wide variety of uses and implementations other than in a library, such as for example in a bank, a post office, or a videotape rental facility.

Device 100 includes a generally planar front panel member 110 having opposing front and rear faces 114 and 116, respectively, and a generally rectangular return aperture 120 disposed therethrough. Panel member 110 serves as a foundation or frame upon which other components associated with device 100 are mounted upon or coupled thereto.

Device 100 also includes actuators 130L and 130R, and a generally rectangular door 140 in proximity to return aperture 120 and to actuators 130L–R. As will be further described, door 140 is secured to actuators 130L and 130R in an arrangement that provides a selective blocking or closing of return aperture 120.

Device 100 further includes a patron-activated switch means 150 for generation of a start-up alarm signal triggering input to an access device control as will be further described, and a materials sensor means 155 for operation of door 140 as will also be further described. Device 100 also includes a message means 160.

Panel member 110 is preferably fabricated into a frame-like and generally rectangular planar panel. In an exemplary embodiment of device 100, panel member 110 has rectangular dimensions of 29.5" by 23.5", and is fabricated from 16-ga. stainless steel. Panel member 110 may, of course, be constructed from any suitable material such as, for example, powder-coat painted mild steel, or another metal, plastic, or fiberglass. Such material would preferably have properties similar to 16-ga. stainless steel, namely, the properties of strength, durability, and resistance to outside forces (whether human or environmental).

Return aperture 120 is provided through front and rear faces 114 and 116, respectively, of panel member 110 by any suitable method of creating a void in a member, such as, for example, by machining or milling panel member 110. Return aperture 120 is illustrated as a rectangular aperture or opening in and through panel member 110 at a generally lower central location of panel member 110. As depicted in the drawings, return aperture 120 is defined by left and right sides 121L and 121R, respectively, and by top and bottom sides 123T and 123B, respectively.

With particular reference to FIG. 3, showing rear face 116 of panel member 110, actuators 130L and 130R are secured to rear face 116 of panel member 110. Actuators 130L–R are preferably structurally identical. Furthermore, actuators 130L–R are preferably secured, respectively, adjacent to and away from sides 121L and 121R of return aperture 120 such that neither actuator 130L–R interferes with nor obstructs return aperture 120. Such securing of actuators 130L–R to rear face 116 may be accomplished by any suitable fastening means, such as, for example, bolting end portions of actuators 130L–R to rear face 116 as indicated generally by numerals 132.

As depicted in the drawings, longitudinal reference axes A-A and B-B extend along a longitudinal centerline of each actuator 130L and 130R, respectively. The attachment of each actuator 130L–R to rear face 116 is further provided such that these reference axes A-A and B-B are substantially parallel. It should be noted that left and right sides 121L and 121R of return aperture 120 are substantially also parallel to reference axes A-A and B-B, and that top and bottom sides 123T and 123B of return aperture 120 are substantially orthogonal to axes A-A and B-B. Actuators 130L and 130R function, as will be further described, to provide vertical opening and closing, or "up-and-down", actuation of door 140, such that aperture 120 may be selectively unblocked or blocked thereby.

Each actuator 130L and 130R may be provided by way of an air-operated linear slide actuator manufactured by Bimba Manufacturing Company, of Monee, Ill., and specifically, by way of a commercially available Bimba "Ultran-Series" rodless air-operated linear slide actuator having a 4" stroke and a 9/16" bore.

Figure 4:
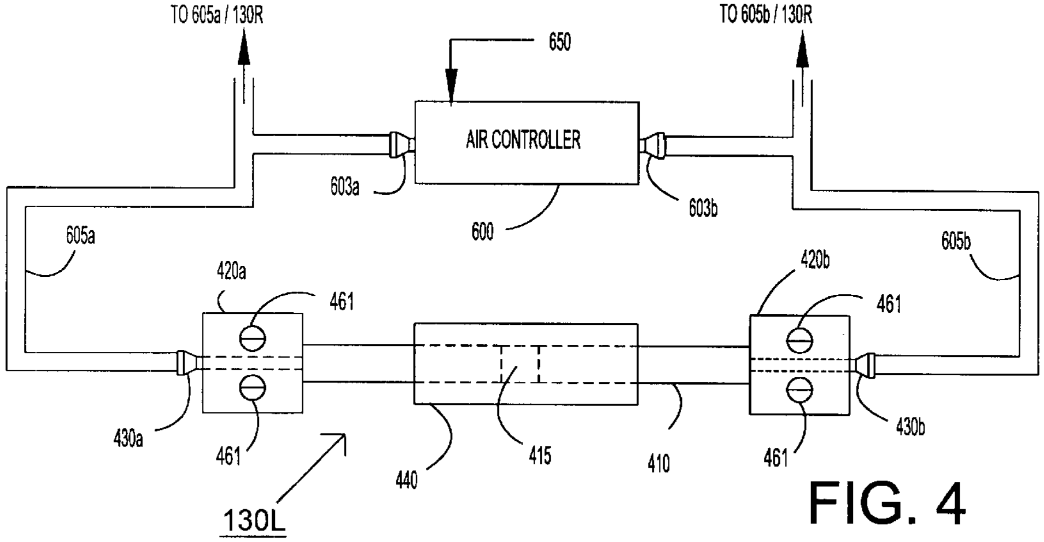
FIG. 4 is a top plan view illustration of an air-operated actuator of the prior art in combination with an air controller of the present invention.

FIG. 4 illustrates partial details of actuator 130L of the aforesaid Bimba air-operated linear slide actuator. In this exposition, actuator 130L is also representative of actuator 130R. Such an air-operated actuator 130L includes a stainless steel central piston tube body 410. One end of central piston tube body 410 is secured in place to end block 420*a*, and the other end thereof is secured in place to opposite end block 420*b*. An end air orifice 430*a* and 430*b* is provided at each end block 420*a* and 420*b*, respectively. Piston tube body 410 contains a magnetized piston 415 that is capable of conventional longitudinal movement within piston tube body 410. Each end air orifice 430*a–b* is provided to be in communication with opposing interior portions of piston tube body 410 as defined by portions thereof separated by piston 415. Also, coupled to each end air orifice 430*a* and 430*b* is an air line 605*a* and 605*b*, respectively. As shown in the drawing, each air line 605*a* and 605*b* has two branches, for supply to each actuator 130L and 130R.

Figure 5:
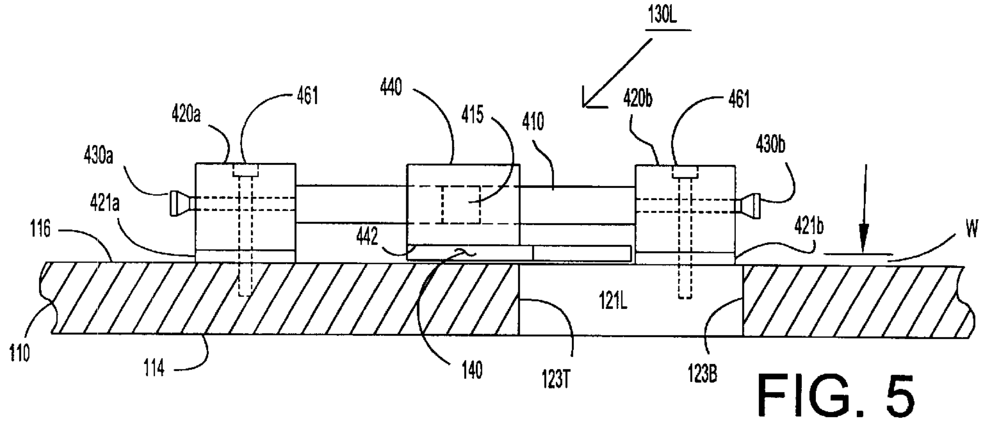
FIG. 5 is a more detailed side view illustration of a portion of the access device constructed in accordance with the present invention as depicted in FIG. 2.

As depicted in FIGS. 3–6, representative actuator 130L further includes a partially ferrous carriage 440 provided for slideable engagement along piston tube body 410. With particular reference to FIG. 5, by virtue of magnetic interaction or coupling between magnetized piston 415 and partially ferrous carriage 440, linear movement of magnetized piston 415 will cause carriage 440, being magnetically coupled thereto, to move linearly along piston tube body 410.

Further illustrated in FIG. 4 is air controller 600 having separate pressurized air outputs 603*a* and 603*b* coupled, respectively, to air lines 605*a* and 605*b*. Air controller 600 is intended to be responsive to an air controller command signal as is generally identified by numeral 650. In operation, air controller 600 responds to air controller command signal 650 to selectively supply pressurized air in either air line 605*a* or 605*b* by way of an air pump (not illustrated). Depending upon which air line, 605*a* or 605*b*, has conducted the pressurized air to end air orifice 430*a* or 430*b*, respectively, such pressurized air then causes piston 415 to slide toward either end block 420*b* or 420*a*, respectively.

It will be appreciated by those skilled in the art that piston 415 within piston tube body 410, upon receiving sufficient pressurized air introduced through end air orifice 430*a* or 430*b*, will cause linear movement of piston 415 and will thus cause corresponding movement of carriage 440. For example, with continued reference to FIG. 4, pressurized air supplied through air line 605*a* only (such that air line 605*b* is not conducting pressurized air) will cause piston 415 to move fully toward end block 420*b*. If, conversely, pressurized air is conducted through air line 605*b* only (air line 605*a* is not conducting pressurized air) then piston 415 will be forced to move fully toward end block 420*a*. In each instance, and as aforementioned, carriage 440 moves along an exterior of piston tube body 410 in response to movement of piston 415 within piston tube body 410 by virtue of the magnetic coupling between carriage 440 and piston 415. It should be further noted that pressurized air, or an absence thereof, introduced equally in air lines 605*a* and 605*b* would cause piston 415 and, correspondingly, carriage 440, to be held in place relative to piston tube body 410.

Figure 6:
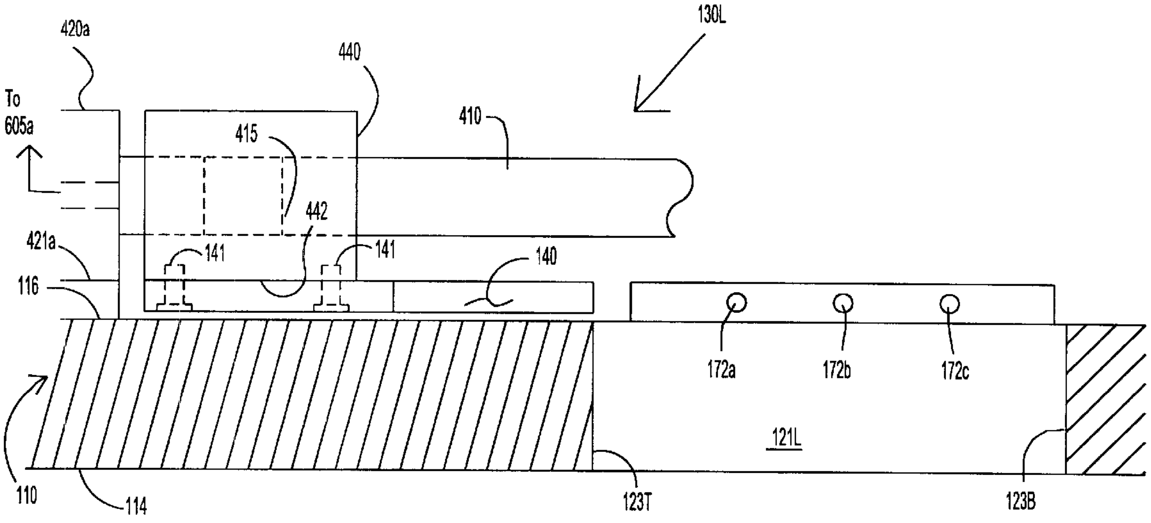
FIG. 6 is a magnified illustration of FIG. 5.

FIG. 5 is a partial cross-sectional view of panel 110, door 140, and one of the actuators 130L. Identical actuator 130R is aligned with actuator 130L and is therefore not visible in the drawing. FIG. 6 also depicts the cross-sectional view of FIG. 5, in a magnified fashion, further showing an obstruction sensing scheme as will be subsequently described. Specifically, carriages 440 of slides 130L–R each include a generally planar mounting surface 442 intended for secure attachment, thereto, of opposite left and right end portions of door 140. That is, mounting surface 442 of carriage 440 of slide 130L is attached to the left end portion of door 140, while mounting surface 442 of carriage 440 of slide 130R is attached to the right end portion of door 140.

It should be noted that, as illustrated in FIG. 5, a space or width "w" identified between mounting surface 442 and rear face 116 must be sufficiently wide to accommodate the thickness of door 140 and permit slidable movement thereof in juxtaposition with rear face 116 as will be further described. The width "w" is, of course dependent upon dimensions of end blocks 420*a–b*. If necessary, spacers 421*a* and 421*b* may be provided between end blocks 420*a* and 420*b*, respectively, and rear face 116 to achieve the desired width "w" for a selected thickness dimension of door 140.

In accordance with the present invention, and referring once again particularly to FIGS. 1, 3, and 5, actuators 130L and 130R are secured to rear face 116. As aforementioned, such securing of slides 130L–R is provided so that slides 130L–R are spatially arranged to be in parallel with each other, with reference axes A-A and B-B being substantially in parallel, and to also be in parallel with return aperture sides 121 L and 121R. Left and right end portions of door 140 are secured to carriage mounting surface 442 of each actuator 130L and 130R, respectively, as aforedescribed. Thus, with a proper width "w" accommodating a thickness of door 140, upon sliding concurrent movement of carriages 440 of each slide 130L–R, door 140 moves in a plane parallel to and along rear face 116 without being subjected to binding or frictional interference therefrom. In this regard, and as will be further described, door 140 is actuated by cooperative and concurrent movement of each carriage 440 of each actuator 130L–R in a vertical or "up or down" sense along reference axes A-A and B-B, respectively. Generally, this cooperative movement of each carriage 440 provides a desired up or down actuation of door 140 in juxtaposition with rear face 116 for selected unblocking or blocking, respectively, of return aperture 120.

Door 140, in an exemplary construction like that of the aforedescribed panel member 110, may be fabricated from 16-ga. stainless steel having a thickness of about 0.5", and having rectangular dimensions of about 4" by 16.25" that are dimensionally sufficient to fully block return aperture 120. Secure attachment of each carriage 440 to opposite ends, respectively, of door 140 may be achieved by use of, for example, any suitable fasteners (generally identified by reference numerals 141).

Figure 7:
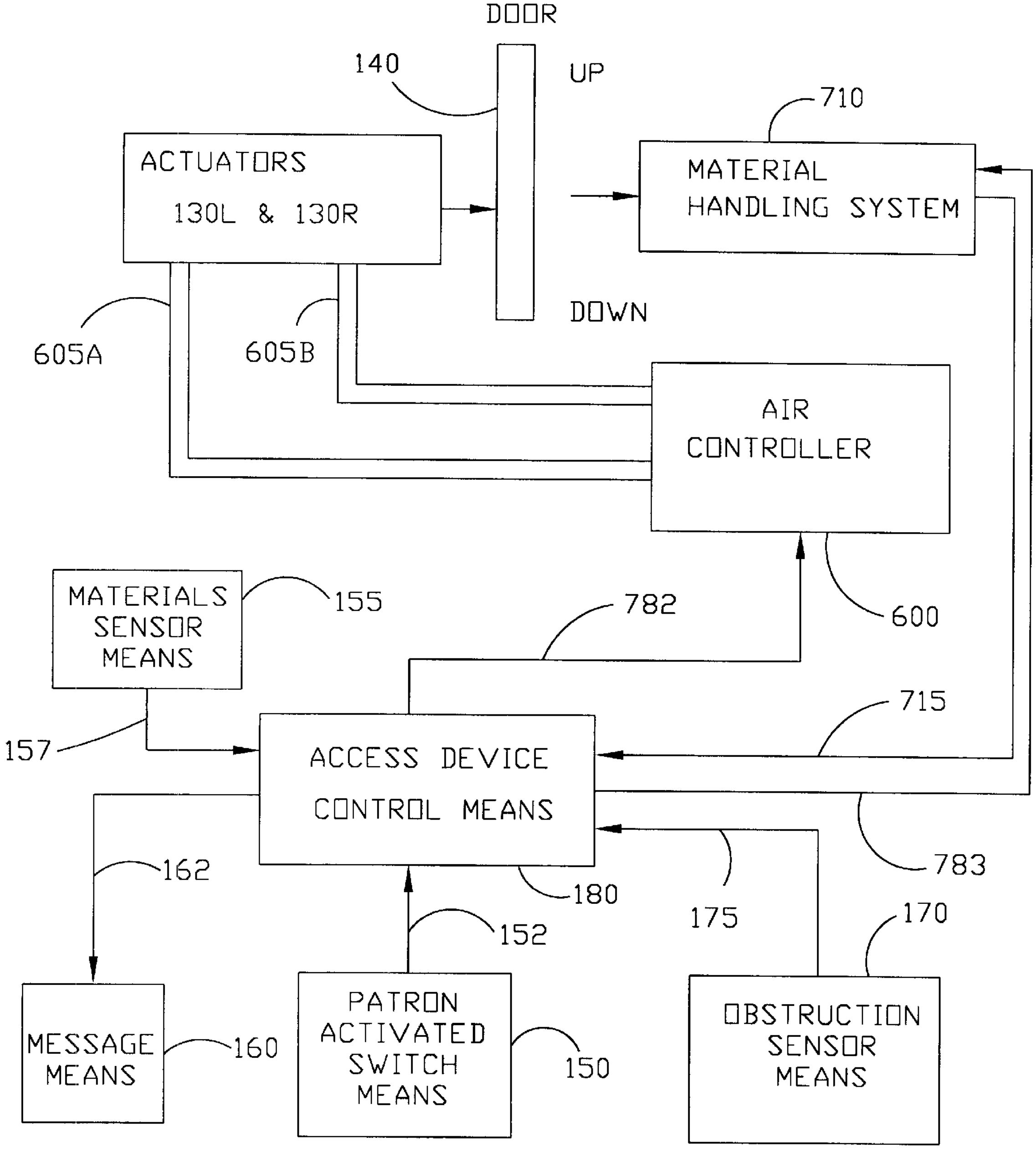
FIG. 7 is a schematic diagram of a control system in accordance with the present invention.

Referring now, to FIG. 7, therein illustrated is a block schematic diagram of an access device control system in accordance with the present invention. Thereshown is an access device control means 180 for controlling operation of actuators 130L and 130R and associated door 140 in response to a plurality of inputs, and also for providing interactive output information for the user or patron of access device 100 by way of selected messages delivered through message means 160.

With further reference to FIG. 7, and as will be further described in detail, access device control means 180 is intended to (i) be responsive to inputs provided by outputs of patron-activated switch means 150, materials sensor means 155, obstruction sensor means 170, and material handling system 710, and (ii) provide outputs of (a) a "command open" or "command close" signal 782 to air controller 600, (b) a "command start-up" or "command shutdown" signal 783 to material handling system 710, and (c) a message signal 162 to message means 160. In accordance with the present invention, control means 180 is operative for controlling actuators 130R and 130L by way of air controller 600 and air lines 605*a–b* so as to selectively permit or block passage of materials through aperture 120 depending upon a selected position of door 140.

With continued reference to FIG. 7, access device control means 180 communicates with air controller 600 to achieve responsiveness of actuation of door 140 to materials sensor means 155 and to obstruction sensor means 170. That is, and as will be further described in operation of device 100, access device control means 180 provides for selective signaling to air controller 600 to generate pressurized air to be delivered through branches of, alternatively, air lines 605*a* or 605*b*, and thus to end air orifices 430*a* or 430*b*, respectively, of each actuator 130L–R. It is to be understood that such selected delivery of pressurized air through branches of either air lines 605*a* or 605*b* provides, consequently, for virtually simultaneous and identical actuation of each actuator 130L–R. Such virtually identical actuation of actuators 130L–R provides, in turn, uniform and non-binding vertical movement of door 140.

Access device control means 180 may be provided by, for example, a stand-alone microprocessor or the like for implementing a set of instructions (not illustrated), or may be a computer program (not illustrated) embodied within and operative on an inter-library computer workstation (also not illustrated).

Returning, now, to FIGS. 1 and 3, patron-activated switch means 150 and materials sensor means 155 are provided on panel member 110 for enabling a patron to commence operation of access device 100. Patron-activated switch means 150 is preferably located on, and secured to, an upper portion of front face 114 of panel member 110.

One example of patron-activated switch means 150 is a Panasonic WV-BP550 or WV-BP554 closed-circuit television (CCTV) camera that is similar to well-known surveillance cameras. The CCTV camera acts as a motion-controlled camera that responsively generates an electrical alarm signal when motion is detected thereby.

Specifically, and with reference also to FIG. 7, the CCTV camera of patron-activated switch means 150 is intended to generate a start-up alarm signal 152 when a patron approaches device 100. Such generation of start-up alarm signal 152 is initiated in response to motion of an approaching patron sensed by the CCTV camera.

Additionally, the CCTV camera may also be capable of making a video recording of a patron who is approaching device 100, and of displaying "real time" images thereof to a remote television for surveillance of device 100 by library personnel.

Referring to FIGS. 1 and 2, thereshown also is a materials sensor means 155 preferably located on, and secured to, a central portion of front face 114 of panel member 110, just above return aperture 120 for sensing materials to be introduced by a patron to return aperture 120. In selected conditions, as will be further described in operation of device 100, activation of materials sensor means 155 causes door 140 to open to an unblocking position, thereby revealing an unblocked return aperture 120 for a patron's introduction of materials to be returned thereto.

As also illustrated in FIGS. 1 and 3, a message means 160 is provided at a top portion of front face 114 of panel member 110, adjacent to patron-activated switch means 150. Message means 160 may be provided by a wide array of components and is intended to be responsive to patron-activated switch means 150 by way of access device control means 180 for providing selected messages to patrons depending upon a current status of the depository. Specifically, and as will further be described in operation of device 100, message means 160 (as shown generally in FIG. 7) is responsive to a selected message signal 162 output from control means 180 so that patrons may be informed of a current status of device 100.

Referring particularly, now, to FIGS. 1, 2, and 6, device 100 further includes a door obstruction sensing scheme generally indicated by obstruction sensor means 170. In the preferred embodiment of the invention, a photoelectric sensing technique is employed so as to ascertain a presence of any object within a volume of space generally blocked by door 140 in a blocking condition. This is intended to address both safety considerations; i.e., door 140 may not close when a patron's hand or finger is in the way of door 140, as well as an operational consideration that door 140 may not close upon material until the material has passed completely through return aperture 120.

In an exemplary embodiment of the invention, a plurality of photoelectric sensing devices are employed for obstruction sensor means 170 to monitor the aforesaid volume of space generally blocked by door 140. These photoelectric sensing devices may be provided through utilization of commercially available Allen-Bradley PHOTOSWITCH™ 42FB General Purpose Fiber Optic Photoelectric Sensors (not illustrated).

As will be further described, obstruction sensor means 170 collectively includes opposing mounting brackets 171L and 171R secured adjacent to sides 121L and 121R, respectively, of return aperture 120, and red light transmitter/receiver elements ("light elements") 172*a–c* and 172*d–f* in communication with the Allen-Bradley photoelectric sensors via fiber optic cables. Specifically, in the preferred embodiment, light elements 172*a–f* function as sets of paired transmitter outputs and receiving inputs to three Allen-Bradley photoelectric sensors. That is, the three photoelectric sensors each have a transmitting light output and a receiving light input. Foe example, light elements 172*a–c* may provide the transmitting light outputs, respectively, of each photoelectric sensor, while light elements 172*d–f* may provide the receiving light inputs, respectively, to each photoelectric sensor. Accordingly, then, a first of the three photoelectric sensors may include an output from element 172*a*, and an input from element 172*d*. Likewise, a second photoelectric sensor may include an output from element 172*b*, and an input from element 172*e*. Finally, a third photoelectric sensor may include an output from element 172*c*, and an input from element 172*f*.

FIG. 2 is a right side view of device 100 showing details of certain components of sensor means 170 in spatial relationship to panel member 110 and to return aperture 120. FIG. 6 is a magnified partial cross-sectional view similar to that of FIG. 5 with door 140 in a raised or unblocking position.

As shown in the drawings, mounting brackets 171L–R are secured to rear face 116 such that return aperture 120 is not obstructed thereby. Mounting brackets 171L–R are preferably fabricated from UHMW plastic sheet material of about 0.5" thickness into generally planar members. Further, brackets 171L–R are secured to rear face 116 in a widthwise opposing relationship with respect to return aperture sides 121L–R by any suitable means such as, for example, threaded fasteners.

Light elements 172*a–c* and 172*d–f* are mounted, respectively, to mounting brackets 171L and 171R in an opposing relationship along left and right sides 121L and 121R of return aperture 120. The securing of light elements 172*a–f* to their respective mounting brackets 171L–R is preferably accomplished by drilling holes in mounting brackets 171L–R to accommodate head end portions of each light element 172*a–f*. Light elements 172*a–f* are positioned in the holes such that the aforementioned head end portions thereof are substantially flush with planar interior surfaces of mounting brackets 171L–R. Light elements 172*a–f* are then secured in the holes of mounting brackets 171L–R by any suitable means such as, for example, by way of an epoxy adhesive. It is to be understood that the holes are provided in mounting brackets 171L–R so that when light elements 172*a–f* are secured therewithin, lines of sight exist between the aforementioned light element pairs (i) 172*a* and 172*d*, (ii) 172*b* and 172*e*, and (iii) 172*c* and 172*f*. Specifically, the secured arrangement of light elements 172*a–f* on respective mounting brackets 171L–R is provided such that the light element 172*a–f* pairs may transmissively cooperate or interact with each other. For example, light elements 172*a* and 172*d* are located on and secured to mounting brackets 171L and 171R, respectively, to be in line-of-sight communication with each other, as is conventionally provided with implementation and utilization of such elements. Likewise, light element pairs 172*b* and 172*e*, and 172*c* and 172*f*, respectively, are in such line-of-sight arrangement with respect to each other, as secured to mounting brackets 171L–R, respectively. It is to be understood, as will be described below, that these lines-of-sight are provided to widthwisely traverse return aperture 120 in substantial alignment with a plane corresponding approximately to a plane of rear face 116.

In conventional operation of the Allen-Bradley photoelectric sensors as provided in the present invention, a light output is transmitted from a photoelectric sensor via a fiber optic cable to a transmitting output light element such as, for example, element 172*a*. A beam of this light output is then projected from element 172*a* to, as aforementioned, widthwisely traverse return aperture 120 in substantial alignment with a plane corresponding approximately to a plane of rear face 116, and to then arrive at paired receiving input light element 172*d*. The light received at input light element 172*d* is then again transmitted via fiber optic cable back to the sensor.

Also in a conventional manner, each photoelectric sensor responsively generates a logical "1" or "ON" signal as it continues to receive an uninterrupted light beam output from a receiving element. However when, for example, receiving light element 172*d* does not receive light being transmitted from element 172*a*, such as when an object interrupts the line-of-sight between elements 172*a* and 172*d*, the photoelectric sensor then responsively generates a logical "0" or "OFF" signal. With additional reference to FIG. 7, these logical "1" or "0" signals are provided as an obstruction sensor means signals 175 output from obstruction sensor means 170 to access device control means 180. As will be further described, "1" or "0" obstruction sensor means signals 175 are then interpreted by access device control means 180 as indicative of respectively either (i) an unobstructed or"not in use" return aperture 120, or (ii) an obstructed or "in use" return aperture 120.

Referring again to FIGS. 1 and 2, device 100 also includes a materials sensing scheme generally indicated by the aforementioned materials sensor means 155 for sensing materials to be introduced by a patron to return aperture 120 of device 100.

In the preferred embodiment of the invention, a photoelectric sensing technique is employed so as to ascertain a presence of any object within a volume of space generally in proximity to front face 114 at return aperture 120. This is intended, as will be further described, to facilitate opening of door 140 for unblocking of return aperture 120 so that materials may be returned thereto by a patron.

In an exemplary embodiment of the invention, a photoelectric sensing device is employed for materials sensor means 155 to monitor the aforesaid volume of space generally in proximity to return aperture 120. The photoelectric sensing device may be again provided through utilization of the aforedescribed Allen-Bradley photoelectric sensor and fiber optic cable (not illustrated).

Specifically, for materials sensor means 155, the photoelectric sensor is preferably employed in a reflective technique (whereas, relative to door obstruction sensor means 170, the three photoelectric sensors and light elements 172*a–f* were each employed in a transmissive technique). That is, materials sensor means 155 singularly embodies both a transmitting light output element from the Allen-Bradley photoelectric sensor via fiber optic cable, and a reflective light input element to the photoelectric sensor via fiber optic cable. It is to be appreciated that reflective light input occurs when light transmitted from sensor means 155 is reflected off an object such as, for example, library material, and then received back as an input at sensor means 155.

In a conventional manner in this reflective technique using the photoelectric sensor, with reference also to FIG. 7, the photoelectric sensor responsively generates a logical "0" or "OFF" materials alarm signal 157 as light being transmitted from materials sensor means 155 is not being reflected off an object and thereby not being received back at sensor means 155. When, however, an object near sensor means 155 causes light to be reflected therefrom back to sensor means 155, as when a patron has brought library materials near return aperture 120, then the photoelectric sensor responsively generates a logical "1" or "ON" signal. These logical "0" or "1" materials sensor signals 157 generated by the reflective photoelectric sensor of materials sensor means 155 are then interpreted, as will be further described, by access device control means 180 as indicative of, respectively, either a condition where (i) door 140 is to remain closed in a blocking position relative to aperture 120 or (ii) door 140 is to be opened to an unblocking position, thereby revealing return aperture 120 for a patron's introduction of materials to be returned thereto. More specifically, generation of a "1" materials alarm signal 157 by materials sensor means 155, output to control means 180, causes, in turn, control means 180 to responsively generate and output a command signal 782 so as to direct air controller 600 to provide pressurized air inputs to actuators 130L–R for actuation of door 140.

Normal Operation of Device 100

Normal operation of device 100 will now be described with reference to FIGS. 1–7, and with particular emphasis given to implementation and operation of device 100 in a library where patrons returning library books and materials may have access thereto. As stated above, such a location may be, for example, a convenient drive-up library location.

It should first be noted that the aforesaid preferred dimensioning of return aperture 120, of 12"×4", is selected to approximately match or accommodate dimensions of typical library books and materials. It should be appreciated that this specific dimensioning acts to prevent introduction of items other than library books and materials into return aperture 120; accordingly, then, the library is afforded a modicum of protection from acts of vandalism and other unwanted activity that could otherwise occur at device 100 via contraband introduction through return aperture 120.

Consider, now, operation of device 100 from an initially closed condition in which return aperture 120 is fully blocked or obstructed by door 140 in a full downward condition, as when a patron approaches device 100 for a purpose of returning books and materials to a library. It is presumed that the patron has been previously instructed by library staff in use of device 100, or that the patron can readily discern how to operate device 100 from its overall appearance and possibly a placard (not illustrated) affixed onto or near device 100 and stating, for example, "BOOK DEPOSITORY".

First, and with particular reference to FIGS. 1 and 7, the patron by virtue of reaching a selected physical proximity to patron-activated switch means 150 activates patron-activated switch means 150 in the well-known manner of such devices as aforedescribed. In response to a proximity or motion-sensing actuation, patron-activated switch means 150 generates start-up alarm signal 152. In response to startup alarm signal 152, access device control means 180 selectively generates the aforesaid command start-up signal 783 that causes activation material handling system 710. Material handling system 710 preferably includes a motorized conveyor for transportation of materials being returned through return aperture 120 to an interior of a library.

Concurrently, the aforesaid message signal 162 is generated by access device control means 180 and transmitted to message means 160 for generation of an audio message for an approaching patron (having been sensed by patron-activated switch means 150). The audio message then states, for example, "WELCOME TO THE LIBRARY—PLEASE BRING YOUR MATERIALS TO BE RETURNED NEAR THE DEPOSITORY AND THE DOOR WILL OPEN AUTOMATICALLY."

Message means 160 may, alternatively to or in combination with the audio message, be an illuminable display for communication to the patron. The illuminable display may be provided by way of, for example, a conventional liquid crystal diode (LCD) text message display.

Next, it is presumed that the patron would follow such audio direction from message means 160 and bring materials to be returned near to door 140 of device 100. As the materials are brought near door 140, materials sensor means 155 senses a presence of such objects. In response thereto, materials sensor means 155 generates materials alarm signal 157. In turn, control means 180 generates, and transmits to air controller 600, a command open signal 782.

With reference to FIGS. 4 and 7, air controller 600 then commands the aforesaid air pump to generate and deliver pressurized air, simultaneously through each aforesaid branch of air line 605*b*, to end air orifices 430*b* of each actuator 130L–R.

With particular reference now to FIGS. 3 and 4, the delivery of pressurized air to end air orifices 430*b* of each actuator 130L–R causes, as aforedescribed, an interior portion of piston tube body 410 in communication with end air orifices 430*b* to contain a higher air pressure than an interior portion of piston tube body 410 in communication with end air orifices 430. Such an air pressure differential within each piston tube body 410 taken as a whole, being separated into relatively high and low air pressure opposing portions by piston 415, acts upon piston 415 to cause movement of piston 415 upward toward the relatively lower air pressure portion of piston tube body 410 adjacent to end air orifice 430*a* of each actuator 130L–R. Since carriage 440 is magnetically coupled to piston 415, carriage 440 of each actuator 130L–R moves upward along piston tube body 410 as piston 415 moves upward toward end air orifice 430*a* of each actuator 130L–R.

Thus, door 140 is caused to move upwardly in a direction of each piston 415 and each carriage 440. When carriages 440 contact end blocks 420*a* of each actuator 130L–R, respectively, upward motion thereof ceases. Carriages 440 maintain this full upward position by virtue of the full upward position of each piston 415 resulting from the aforedescribed air pressure differential within each piston tube body 410, the magnetic coupling between carriages 440 and respective pistons 415, and a maintenance of pressurization by way of air controller 600 as aforedescribed.

With door 140 in the full up position, thereby revealing return aperture 120, the patron discerns (or has been instructed) that library books and materials may now be deposited into or returned to the library by placement thereof into return aperture 120. Referring particularly to FIG. 2, with door 140 in the full-up open position, the aforesaid conveyor (generally identified as "C" in the drawing) has begun operation for conveyance of the materials being deposited at and through return aperture 120 to, for example, a library check-in station or system or receiving bin. It is to be understood that operation of conveyor C is responsive to the aforesaid command start-up signal 783. It is to be further understood that utilization of conveyor C obviates a need for implementation of a commonly problematic slide chute device for transportation of the materials received through return aperture 120 to a receiving area.

As such depositing is occurring at return aperture 120, obstruction sensor means 170 is predominantly "active". That is, during a majority of time while the patron is depositing books and materials into return aperture 120 and thus onto conveyor C, sensor 170 senses a presence of obstructions in the aforementioned volume of space generally blocked by door 140. Specifically, some or all lines-of-sight between light elements 172*a–f* are broken or interrupted by the materials being deposited into return aperture 120. As aforedescribed in this condition, and with particular reference to FIG. 7, some or all of the three photoelectric sensors responsively generate and output, either continuously or intermittently during a selected time duration measured by control means 180, a logical "0" or "OFF" obstruction sensor means signal 175 to access device control means 180 that is interpreted by control means 180 as indicative of an obstructed or "in use" condition of return aperture 120. In this manner, then, access device control means 180 recognizes that return aperture 120 and device 100 is in use. While device 100 is in use, control means 180 continues to generate and output a command open signal 782 to air controller 600 such that air controller 600 is permitted to only deliver air pressure through air line 605*b*, thereby maintaining door 140 in the full-up or open position.

When the patron is finished depositing the materials to be returned to the library through return aperture 120, the lines-of-sight between light element pairs (i) 172*a* and 172*d*, (ii) 172*b* and 172*e*, and (iii) 172*c* and 172*f*, are restored and each photoelectric sensor of obstruction sensor means 170 accordingly reverts to generation and output of a logical "1" or "ON" obstruction sensor means signal 175 to access device control means 180, being indicative of an unobstructed return aperture 120. After the aforesaid selected time duration measured by control means 180 has elapsed, with the photoelectric sensors of sensor 170 remaining "ON" during that time, access device control means 180 determines or concludes that the patron has finished using device 100 and that therefore return aperture 120 may be closed by closing door 140. Access device control means 180 then generates and outputs a command close signal 782 to air controller 600. In response to command close signal 782, air controller 600 generates and delivers pressurized air, simultaneously through each branch of air line 605*a*, to end air orifices 430*a* of each actuator 130L–R. In a manner as previously described in detail in the alternative command open signal 782 condition, in the command close signal 782 condition carriages 440 and consequently door 140 move downward toward the respective end air orifices 430*b*. Further in like manner, when carriages 440 contact end blocks 420*b* of each actuator 130L–R, respectively, downward motion of door 140 ceases and device 100 is closed. At this time, concurrently, control means 180 generates and outputs a command shutdown signal 783 to material handling system 710. Although, again, not illustrated in the drawings, conveyor C is then preferably responsive after a pre-set time has elapsed, to command shutdown signal 783 being input to material handling system 710 for ceasing operation thereof.

It is to be appreciated that door 140 may be provided with a locking mechanism (not illustrated) for providing closed security of return aperture 120.

Fail-safe Operation of Device 100

Operation of device 100 will now be discussed in a "fail-safe" sense with regard to, for example, a situation that may arise upon an unlikely event of failure of obstruction sensor means 170.

First, such fail-safe provision for device 100 exists by virtue of actuators 130L–R being fully capable of satisfactory actuation and operation when supplied with relatively low air pressure, in a range from about 5 to 15 p.s.i. Preferably, also, the air pump of air controller 600 is capable of delivering such relatively low (5 to 15 p.s.i.) air pressure to actuators 130L–R, and maintaining such air pressure therewithin. Maintenance of air pressure by air controller 600 may be accomplished by any variety of means, such as, for example, a pressure check valve. Consequently, such low air pressure actuation of actuators 130L–R provides a degree of safety to a patron whose hands or fingers may be caught in door 140 during an unlikely event of a malfunction of door obstruction sensor means 170.

Second, upon exertion of a sufficient external opposing force upon carriage 440 opposite to a direction of magnetically coupled movement of carriage 440 with piston 415, the magnetic coupling between piston 415 and carriage 440 may be overcome or "broken", thereby causing carriage 440 to freely or "uncoupledly" slide along piston tube body 410. In this way, a patron's fingers or hands in return aperture 120 exerting a sufficient opposing force on door 140 would cause door 140 to cease downward movement.

Operation of Device 100 when Busy or Out-of-Service

When the library depository and device 100 is busy or is out-of-service, message means 160 operates to so inform a patron desiring to use device 100. Specifically, message means 160 is responsive to a particular input message signal 162 from access device control means 180 (as shown generally in FIG. 7) so that patrons may be informed of a current status of device I 00.

For example, the library depository and device 100 may be busy when a large volume of books and materials have been introduced to the library depository through return aperture 120 of device 100 with the depository "filled to capacity" or when, for example, material handling system 710 has not completed handling of the materials. Alternatively, the library depository and device 100 may be out-of-service, for example, when routine maintenance is being performed on the library depository, or when the library staff chooses to shut down the depository.

Access device control means 180 is intended to be capable of determining these alternative busy or out-of-service conditions of the depository and device 100, by way of, for example, selected inputs to the aforesaid computer program embodied within and operative on the aforementioned inter-library computer workstation. As shown in FIG. 7, such an input may be provided by a “system busy” signal 715 generated and output from material handling system 710, or directly from the library staff on the computer workstation, to control means 180.

In such a busy or out-of-service condition, then, access device control means 180 generates and outputs alternative busy or out-of-service message signals 162, as the case may be, and transmits them as an input to message means 160. Message means 160 then responsively generates audio phrases stating, for example, “THE AUTOMATIC DEPOSITORY IS BUSY—PLEASE WAIT” or “THE AUTOMATIC DEPOSITORY IS CURRENTLY OUT-OF-SERVICE” corresponding to either the busy or out-of-service message signals 162, respectively. As mentioned above, the display or communication of these messages to the patron may be accomplished with, or may be simply replaced by, the aforementioned illuminable LCD display.

Further, when the depository and device 100 are busy or out-of-service, access device control means 180 may be provided to close door 140 in the manner as aforedescribed.

Figure 8:
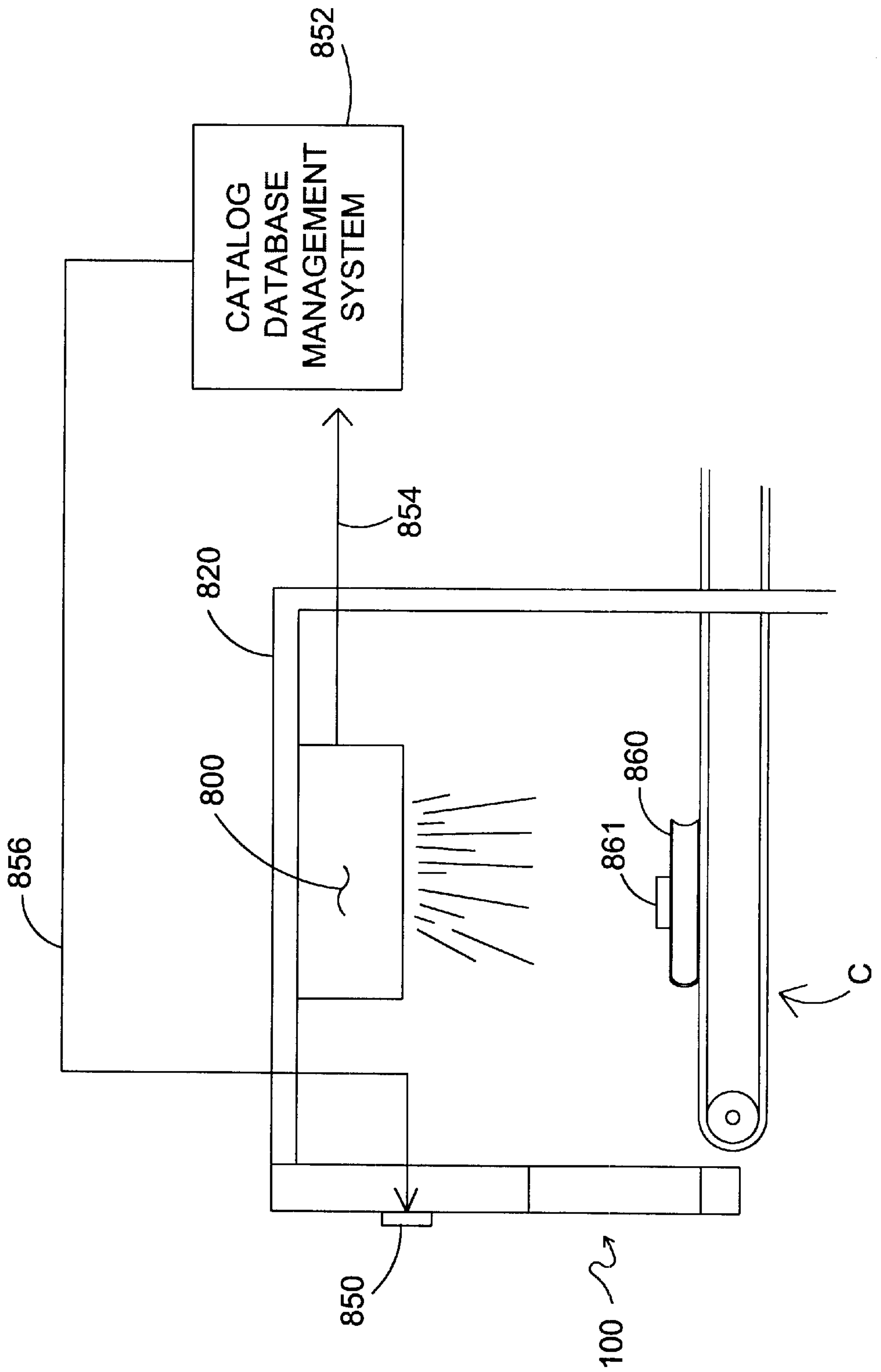
FIG. 8 is a side view illustration of an identification means in accordance with the present invention.

Illustrated in FIG. 8 is a library material handling system incorporating access device 100 of the present invention. The library materials handling system depicted in FIG. 8 illustrates a library materials check-in system along with a receipt printer for printing a receipt indicating that a patron has deposited materials, and/or a receipt indicating what materials were deposited.

Before proceeding, it should be noted that generally each library material item commonly includes an identification tag containing unique identifying information. This identification tag is commonly in the form of a bar-code tag or label. Another type of identification tag is what is commonly referred to as an RFID tag such as those provided by the 3M Company or Checkpoint Systems Inc. These identification tags are generally adhesively secured to each library material item. As is well known, an identification tag may be interrogated by an identification tag reader which is coupled to a catalog data base management system for checking-in or checking-out library materials.

Illustrated in FIG. 8 is access device 100 in combination with an identification tag reader 800, catalog data base management system 852, motorized conveyor C, and a common receipt printer 850. Identification tag reader 800 is held in place by way of a supporting frame 820. Catalog data base management system 852 receives information from reader 800 along data signal line 854. Catalog data base management system 852 transmits information to receipt 850 along data signal line 856.

The following exposition is for a scenario where each of the library items includes an RFID type identification tag intended to be interrogated by way of an identification tag reader in the form of an RFID interrogation reader that is well known in the art. Accordingly, identification tag reader 800 may be a radio frequency interrogation device as is well known in the art. As is also well known, an item with an RFID tag may be interrogated regardless of orientation, and does not require the item to be de-shingled (i.e., it may be haphazardly stacked on other items).

Conveyor C is intended to transport an item, such as book 860 with identification tag 861, so as to be in a vicinity of reader 800 such that identification tag reader 800 may obtain the unique identification information associated with the unique identifier tag 861 by way of the RFID radio frequency technique (or bar-code technique in the alternative).

The method of operation of access device 100 in combination with the library materials handling system depicted in FIG. 8 will be described with reference to the flow diagram of FIG. 9. If a library item 860—block 910, is sensed by material sensor means 155—block 920, access control device means 180 issues a command to unblock return aperture 120 and issues a start-signal to conveyor C to start the conveyor and transport materials there along—blocks 930, 940, and 950.

Once return aperture 120 is no longer blocked by door 140, item 860 may be placed on conveyor C—block 945, so as to be transported in the vicinity of RFID reader 800—block 960. Identifying Information is transmitted to catalog data base management system 852 and “checks-in” item 860—block 970. In turn, catalog database management system 852 issues an information signal to printer 850 for printing a receipt of the item checked in—block 980.

Of course, this process will continue until the patron has no longer any materials to be deposited. At that time, return aperture 120 is blocked—block 990, and a receipt is printed. As aforesaid, the receipt may be one simply indicating that a patron has deposited materials, and/or one indicating what materials were deposited.

Of course, a bar-code reader and a bar-code tag could be substituted for RFID reader 800 and RFID tag 861, respectively. However, employment of a bar-code reader would require various modifications to conveyor C. This is so, since a bar-code tag must be properly aligned relative to a bar-code reader as is well known. Such a modified conveyor system is manufactured by Tech Logic Corporation of Oakdale, Minn. It should be noted that the aforedescribed library materials handling system including the check-in system function may be provided without the employment of the receipt printer.

Figure 9:
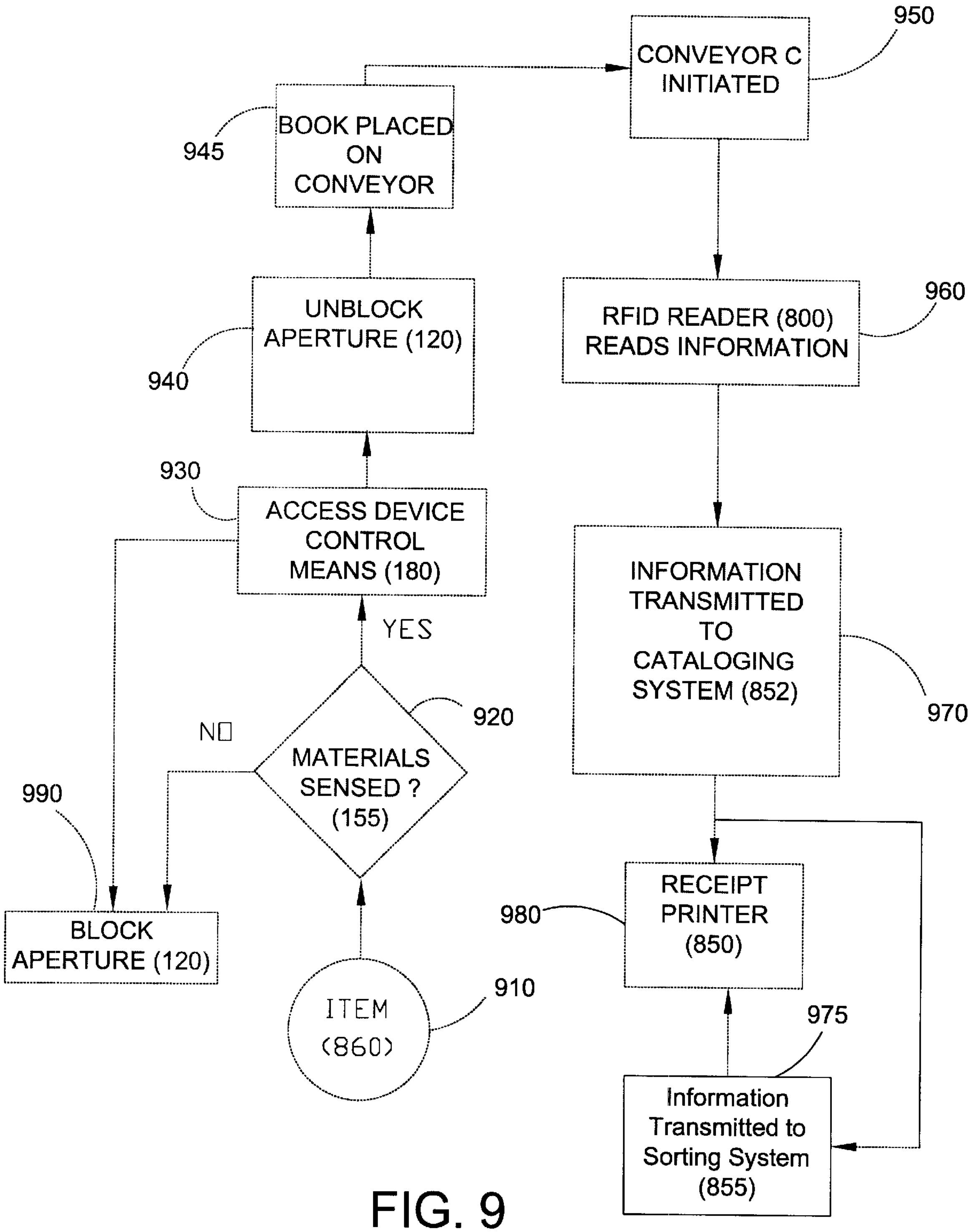
FIG. 9 is a schematic diagram of an identification and cataloging system in accordance with the present invention.

Further, device 100 may also include, with reference to FIG. 9, a materials sorting system 855 (975) responsive to cataloging system 852 (970) as part of a library materials handling system generally incorporating cataloging identifiers. Generally, such a materials handling system is disclosed in co-pending U.S. patent application Ser. No. 09/309,377 filed on May 10, 1999, that is specifically incorporated herein by reference thereto.

Returning, now, to FIGS. 1 and 3, patron-activated switch means 150 could, alternatively, be a conventional illuminated push-button switch labeled “PUSH TO OPEN”. Switch means 150 could also, alternatively, comprise a patron access card reader system, whereby a patron would insert an access card into the patron access card reader system for operation of device 100.

Although not shown, device 100 may also include a rain hood that is fabricated and incorporated into front face 114 of panel member 110 to provide protection for the components of device 100 thereupon from rain and other environmental contaminants. Also, a materials guide may be incorporated with front face 114 to facilitate placing materials in a desired proximity to materials sensor means 155. Further, lighting could be provided under or within the rain hood for nighttime illumination of front face 114 of device 100. Additionally, a surveillance camera could be incorporated into front face 114 for surveillance of a vicinity around device 100. The surveillance camera could, of course, be provided by way of the aforedescribed camera of patron-activated switch means 150. Device 100 could also include a “one-way” or “deposit only” barrier means (not illustrated) for prevention of unauthorized withdrawal of materials back through return aperture 120 at front face 114.

Regarding individual components of device 100, although actuators 130L–R have been illustrated as linear slide actuators, non-linear or complementarily curved actuators may also be utilized to accommodate a corresponding non-linear or complementarily curved door substituted for door 140.

Additionally, although the present invention has been implemented by way of use of air-operated slide actuators 130L–R, other types of actuators may be employed to achieve the intended function of device 100. For example, electrically operated actuators such as chain-driven actuators or jackscrew-type actuators are, of course, within the true spirit and scope of the present invention.

Further, access device control means 180 could include means for providing notification to library staff when, for example, (i) device 100 is in use, (ii) a selected time has elapsed and when, concurrently, an obstruction is sensed by sensor 170, or (iii) message means 160 is or has been operative.

Regarding design choices and materials for construction of device 100, front face 114 of panel member 110 could be, for example, fabricated into any desired shape, such as a curved surface, even though panel member 110 (and front and rear faces 114 and 116, respectively) has been described above as being generally rectangular and planar. Also, access device control means 180 may also be implemented by a wide array of techniques as aforesaid.

The choice of individual components for obstruction sensor means 170 may be provided by a wide array of mechanical, electrical, and electronic sensing devices and switches. For example, the photoelectric sensing devices of sensor means 170 could be chosen to utilize invisible (e.g., infrared or "IR") light.

Of course, the mechanical sizes, dimensions, and strengths of various components are all a matter of design choice depending upon a particular desired utilization of the invention. Accordingly, these and other various changes or modifications in form and detail of the present invention may also be made therein, again without departing from the true spirit and scope of the invention as defined by the appended claims.

Additionally, it should be understood that although the aforedescribed access device control system has been described herein in simple control terms and concepts, more complex controls and systems for controlling the access device for a materials depository of the present invention are all within the true spirit and scope of the present invention as claimed herein.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

Finally, although the present invention has been described relative to a library installation, it should be noted that the access device for a materials depository of the present invention may be implemented in any desired installation, such as a publishing house, a book store, a bank, or a videotape rental facility, to name a few.

We claim:

1. An interactive patron activated library materials depository system comprising:

a depository enclosure including, a panel member having opposing front and rear faces, said panel member including a return aperture of selected size dimensions disposed through said front and rear faces of said panel member, a door having size dimensions capable of fully blocking said return aperture, and a door actuation means coupled to said door for causing said door, in response to a command signal, to selectively slide between, (i) a blocking position where said return aperture is blocked by said door, and (ii) an unblocking position where said return aperture is not blocked by said door;

a patron initiated switch means for generating a start-up alarm signal;

a materials sensor means in proximity to said aperture for providing a materials alarm signal indicative of the presence of materials intended to be passed through said aperture; and a control means, responsive to said materials alarm signal and said startup signal for providing said command signal so as to initiate unblocking of said aperture and permit depositing said library materials by said patron.

2. The system of claim 1, wherein said door actuation means includes at least one air-operated linear slide actuation means.

3. The system of claim 1, further including:

an obstruction sensor means for sensing an obstruction within the vicinity of said return aperture, and providing an obstruction signal in response to an occurrence of said obstruction; and said control means further includes means for sensing said obstruction signal and providing said command signal so as to cause said door to be at said unblocking position.

4. The system of claim 3, wherein said obstruction sensor means includes at least one photo detector transmitter/receiver means for transmission of at least one beam of energy across a portion of said vicinity of said return aperture, and where said obstruction is sensed by interruption of said transmission, whereupon said at least one photo detector transmitter/receiver means generates said obstruction signal.

5. The system of claim 3 wherein said control means further includes means for providing said command signal so as to cause said door to be at said blocking position after a selected time has elapsed following removal of said obstruction signal.

6. The system of claim 5, further including a locking mechanism for selectively locking said door in said blocking position such that access to said return aperture is prevented thereby.

7. The system of claim 5 wherein said control means includes means for providing notification of selected information indicative of an operative status of said system.

8. The system of claim 1, further comprising message means responsive to said control means for providing selected information indicative of an operative status of said system.

9. The system of claim 1, wherein said front face of said panel member further includes a surveillance camera for surveillance of a vicinity outward from said panel member.

10. The system of claim 1, further including a remote control means for selective remote control disablement of said command signal.

11. The system of claim 1, wherein said front face of said panel member includes a hood for protecting a vicinity outward from said return aperture and said door from environmental contaminants.

12. The system of claim 11, wherein said hood further includes lighting means for providing illumination of the vicinity outward from said return aperture and said door.

13. The system of claim 1, wherein said front face of said panel member further includes a surveillance camera for surveillance of a vicinity outward from said panel member, and wherein said surveillance camera includes said patron-activated switch means, where said patron activated switch means is responsive to the visual presence of a patron in view of said surveillance camera.

14. An access device for a materials depository comprising:

a panel member having opposing front and rear faces, said panel member including a return aperture of selected size dimensions disposed through said front and rear faces of said panel member;

a door having size dimensions capable of fully blocking said return aperture;

a door actuation means having at least one air-operated linear slide actuator, said actuator including, (i) a slideable piston disposed within a cylinder, where said piston is slidably moveable by air pressure within said cylinder, and (ii) a carriage magnetically coupled to said piston, and said carriage is coupled to said door for causing said door, in response to a command signal, to selectively slide between, (a) a blocking position where said return aperture is blocked by said door, and (a) an unblocking position where said return aperture is not blocked by said door;

a materials sensor means for providing a materials alarm signal indicative of the presence of materials intended to be passed through said aperture; and a control means, responsive to said materials alarm signal, for providing said command signal.

15. The access device for a materials depository of claim 14 further comprising a patron activated switch means for providing a start-up alarm signal, wherein said control means further includes means responsive to said start-up alarm signal so as to enable said control means to be responsive to said materials alarm signal.

16. The access device for a materials depository of claim 15 wherein said front face of said panel member further includes a surveillance camera for surveillance of a vicinity outward from said panel member, and wherein said surveillance camera includes said patron-activated switch means, where said patron activated switch means is responsive to the visual presence of a patron in view of said surveillance camera.

17. The access device for a materials depository of claim 14, further comprising:

an obstruction sensor means for sensing an obstruction within the vicinity of said return aperture, and providing an obstruction signal in response to an occurrence of said obstruction; and said control means further includes means for sensing said obstruction signal and providing said command signal so as to cause said door to be at said unblocking position.

18. The access device for a materials depository of claim 17 wherein said obstruction sensor means includes at least one photo detector transmitter/receiver receiver means for transmission of at least one beam of energy across a portion of said vicinity of said return aperture, and where said obstruction is sensed by interruption of said transmission, whereupon said at least one photo detector transmitter/receiver means generates said obstruction signal.

19. The access device for a materials depository of claim 17 wherein said control means further includes means for providing said command signal so as to cause said door to be at said blocking position after a selected time has elapsed following removal of said obstruction signal.

20. The access device for a materials depository of claim 19 further comprising a locking mechanism for selectively locking said door in said blocking position such that access to said return aperture is prevented thereby.

21. The access device for a materials depository of claim 19 wherein said control means includes means for providing notification of selected information indicative of an operative status of said access device.

22. The access device for a materials depository of claim 14, further comprising message means responsive to said control means for providing selected information indicative of an operative status of said access device.

23. The access device for a materials depository of claim 14 wherein said front face of said panel member further includes a surveillance camera for surveillance of a vicinity outward from said panel member.

24. The access device for a materials depository of claim 14 further comprising a remote control means for selective remote control disablement of said command signal.

25. The access device for a materials depository of claim 14 wherein said front face of said panel member includes a hood for protecting a vicinity outward from said return aperture and said door from environmental contaminants.

26. The access device for a materials depository of claim 25 wherein said hood further includes lighting means for providing illumination of the vicinity outward from said return aperture and said door.

27. A interactive patron activated library material depository method for depositing library materials into a receiving station having an access panel comprising the steps of:

sensing presence of a patron in a vicinity of said access panel;

placing said library materials in front of said access panel wherein said access panel includes a return aperture of sufficient size for receiving said library materials therethrough, and where said aperture is blocked by a slideable door having size dimensions capable of fully blocking said return aperture;

sensing a presence of said library materials in a vicinity of said return aperture conditioned by sensing said presence of a patron;

sliding said door to an unblocking position where said return aperture is not blocked by said door;

sensing an absence of said materials in a vicinity of said return aperture;

sliding said door to a blocking position, where said return aperture is blocked by said door, upon said sensing an absence of said materials.

28. An interactive patron activated library material depository system comprising:

(i) an access device including, a panel member having opposing front and rear faces, said panel member including a return aperture of selected size dimensions disposed through said front and rear faces of said panel member for receiving materials therethrough;

a door having size dimensions capable of fully blocking said return aperture;

a door actuation means coupled to said door for causing said door, in response to a command signal, to selectively slide between (a) a blocking position where said return aperture is blocked by said door, and (b) an unblocking position where said return aperture is not blocked by said door;

(ii) a materials sensor means for providing a materials alarm signal indicative of the presence of materials intended to be passed through said aperture;

(iii) a motorized conveyor means in proximity to said return aperture for conveyance of materials received through said return aperture, said motorized conveyor means responsive to a conveyor start signal for transporting materials thereon;

(iv) a patron-activated proximity switch means for providing a start-up alarm signal; and (v) a control means, responsive to said materials alarm signal, for providing said command signal and said conveyor start signal, and wherein said control means further includes means responsive to said start-up alarm signal for initiating said conveyor start signal, and enabling said control means to be responsive to said materials alarm signal.

29. The library material handling system of claim 28 wherein said patron-activated proximity switch means includes a television camera including means responsive to the presence or absence of a patron in view of said camera.

30. The library material handling system of claim 28 further including a library materials identification means for specifically identifying said library materials received through said return aperture.

31. The library material handling system of claim 30 wherein said materials identification means is a radio frequency identification (RFID) reader, and where each of said library materials is intended to have a unique identifier associated with a corresponding RFID tag.

32. The library material handling system of claim 30 wherein said materials identification means is a barcode reader, and where each of said library materials is intended to have a unique bar code identifier associated with a corresponding bar code tag.

33. The library material handling system of claim 30 further comprising a cataloging means responsive to said materials identification means for cataloging materials received through said return aperture.

34. The library material handling system of claim 33 further comprising a receipt printout means responsive to said cataloging means, for generating a printed receipt, available to said patron, identifying those materials provided by said patron and received through said return aperture.

35. The library material handling system of claim 33 further comprising a sorting means responsive to said cataloging means for sorting materials received through said return aperture.

36. An interactive patron activated library material depository system comprising:

(i) an access device including, a panel member having opposing front and rear faces, said panel member including a return aperture of selected size dimensions disposed through said front and rear faces of said panel member for receiving materials therethrough;

a door having size dimensions capable of fully blocking said return aperture;

a door actuation means coupled to said door for causing said door, in response to a command signal, to selectively slide between (a) a blocking position where said return aperture is blocked by said door, and (b) an unblocking position where said return aperture is not blocked by said door;

(ii) a materials sensor means for providing a materials alarm signal indicative of the presence of materials intended to be passed through said aperture;

(iii) a motorized conveyor means in proximity to said return aperture for conveyance of materials received through said return aperture, said motorized conveyor means responsive to a conveyor start signal for transporting materials thereon;

(iv) a patron access card reader means responsive to activation by a patron access card for providing a start-up alarm signal; and (v) a control means, responsive to said materials alarm signal, for providing said command signal and said conveyor start signal, and wherein said control means further includes means responsive to said start-up alarm signal for initiating said conveyor start signal, and enabling said control means to be responsive to said materials alarm signal.

37. The library material depository system of claim 36 further including a television camera including means responsive to the presence or absence of a patron in view of said camera.

38. The library material depository system of claim 36 further including a library materials identification means for specifically identifying said library materials received through said return aperture.

39. The library material depository system of claim 38 wherein said materials identification means is a radio frequency identification (RFID) reader, and where each of said library materials is intended to have a unique identifier associated with a corresponding RFID tag.

40. The library material depository system of claim 38 wherein said materials identification means is a barcode reader, and where each of said library materials is intended to have a unique bar code identifier associated with a corresponding bar code tag.

41. The library material depository system of claim 38 further comprising a cataloging means responsive to said materials identification means for cataloging materials received through said return aperture.

42. The library material depository system of claim 41 further comprising a receipt printout means responsive to said cataloging means, for generating a printed receipt, available to said patron, identifying those materials provided by said patron and received through said return aperture.

* * * * *